United States Patent
Helm

(10) Patent No.: US 11,659,331 B2
(45) Date of Patent: May 23, 2023

(54) SYSTEMS AND METHODS FOR AUDIO BALANCE ADJUSTMENT

(71) Applicant: TOYOTA MOTOR ENGINEERING & MANUFACTURING NORTH AMERICA, INC., Plano, TX (US)

(72) Inventor: Sean L. Helm, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/156,493

(22) Filed: Jan. 22, 2021

(65) Prior Publication Data

US 2022/0240015 A1 Jul. 28, 2022

(51) Int. Cl.
| | | |
|---|---|---|
| G10L 15/02 | (2006.01) | |
| H04R 5/02 | (2006.01) | |
| H04W 4/80 | (2018.01) | |
| H04R 5/04 | (2006.01) | |

(52) U.S. Cl.
CPC ............ *H04R 5/02* (2013.01); *H04R 5/04* (2013.01); *H04W 4/80* (2018.02); *H04R 2499/13* (2013.01)

(58) Field of Classification Search
CPC ........ H04R 5/04; H04R 2499/13; H04R 5/02; H04W 4/80
See application file for complete search history.

(56) References Cited

U.S. PATENT DOCUMENTS

| | | | |
|---|---|---|---|
| 8,265,293 B2 | 9/2012 | Park | |
| 8,462,190 B2 | 6/2013 | Togami | |
| 9,693,328 B1 * | 6/2017 | Call | H04B 7/26 |
| 9,842,496 B1 * | 12/2017 | Hayward | G01C 21/34 |
| 10,171,911 B2 * | 1/2019 | Lee | H04R 5/04 |
| 10,235,122 B1 * | 3/2019 | Goel | G06F 3/1423 |
| 11,245,374 B2 * | 2/2022 | Wahlberg | H04R 1/406 |
| 2008/0159565 A1 | 7/2008 | Kim | |
| 2015/0256954 A1 * | 9/2015 | Carlsson | H04R 3/12 |
| | | | 381/59 |
| 2015/0358715 A1 * | 12/2015 | Macours | H04R 1/1041 |
| | | | 381/74 |
| 2016/0057392 A1 * | 2/2016 | Meidan | G06Q 10/063114 |
| | | | 348/148 |
| 2016/0286313 A1 * | 9/2016 | Kofman | H04R 3/12 |

(Continued)

FOREIGN PATENT DOCUMENTS

| | | |
|---|---|---|
| CN | 2897745 Y | 5/2007 |
| CN | 111132117 A | 5/2020 |

(Continued)

*Primary Examiner* — Neeraj Sharma

(74) *Attorney, Agent, or Firm* — Sheppard, Mullin, Richter & Hampton LLP; Hector A. Agdeppa; Daniel N. Yannuzzi

(57) ABSTRACT

Systems and methods are provided for using one or more external Bluetooth speakers in conjunction with an in-vehicle Bluetooth-enabled audio system. Locational features or aspects of the external Bluetooth speakers and the in-vehicle Bluetooth-enabled audio system can be leveraged in a manner that allows for automatic or manual adjustment of the one or more external Bluetooth speakers, e.g., adjusting left/right balance of the one or more external Bluetooth speakers based on the position or location of the or more external speakers relative to the vehicle, in-vehicle Bluetooth-enabled audio system, etc.

15 Claims, 7 Drawing Sheets

(56) References Cited

U.S. PATENT DOCUMENTS

| | | | |
|---|---|---|---|
| 2017/0127165 A1* | 5/2017 | Kanagaraj | H04R 1/025 |
| 2017/0272888 A1* | 9/2017 | Dausel | H04S 7/30 |
| 2018/0047290 A1 | 2/2018 | Min | |
| 2018/0181365 A1* | 6/2018 | Winton | H03G 3/32 |
| 2018/0222384 A1* | 8/2018 | Dudar | B60W 10/06 |
| 2018/0302734 A1* | 10/2018 | Choi | H04S 7/30 |
| 2019/0215540 A1* | 7/2019 | Nicol | H04N 21/4223 |
| 2019/0306650 A1* | 10/2019 | Jin | H04R 5/04 |
| 2020/0007993 A1* | 1/2020 | Lyon | H04R 25/505 |

FOREIGN PATENT DOCUMENTS

| | | | |
|---|---|---|---|
| JP | 2012049967 | * | 3/2012 |
| KR | 20150128616 | * | 5/2014 |
| KR | 20170019662 | | 2/2017 |

\* cited by examiner

SYSTEMS AND METHODS FOR AUDIO BALANCE ADJUSTMENT

TECHNICAL FIELD

The present disclosure relates to audio speakers, and in particular, leveraging audio sharing and location-based services for position-dependent audio balancing.

DESCRIPTION OF RELATED ART

Vehicles are generally equipped with audio systems. These audio systems generally have a display within an instrument panel and a plurality of speakers dispersed within a cabin of the vehicle. Generally, a vehicle occupant, such as a driver of the vehicle, may use the display to adjust a volume and to choose a radio station, an auxiliary input, a Bluetooth connection with a mobile electronic device, and the like.

BRIEF SUMMARY OF THE DISCLOSURE

In accordance with one embodiment, a method may comprise, receiving, at an audio system of a vehicle, a direction finding signal from a speaker operatively connected to the audio system of the vehicle and located external to the vehicle. The method may further comprise determining, by the audio system of the vehicle, a location of the speaker relative to a vehicle reference point. Further still, the method may comprise adjusting, by the audio system of the vehicle, audio balance of the speaker based on the determined location of the speaker relative to the vehicle reference point.

In some embodiments, the speaker comprises a Bluetooth speaker, and wherein the audio system comprises an in-vehicle Bluetooth-enabled audio system.

In some embodiments, the method may further comprise receiving streamed audio from a source device operatively connected to the audio system.

In some embodiments. the adjusting of the audio balance of the speaker comprises adjusting a left/right balance of the speaker.

In some embodiments, the adjusting of the audio balance of the speaker is performed automatically.

In some embodiments, the determining of the location of the speaker comprises at least one of determining an angle of arrival or angle of departure calculation regarding the direction finding signal, and determining a location through trilateration via a plurality of locator receivers and a tag associated with the speaker.

In some embodiments, the adjusting of the audio balance comprises emulating in-vehicle audio balance experience externally to the vehicle.

In accordance with another embodiment, a vehicle may comprise: an audio source device; and a Bluetooth speaker located externally to the vehicle outputting audio from the audio source device via an in-vehicle Bluetooth-enabled audio system. The in-vehicle Bluetooth-enabled audio system may: receive a direction finding signal from the Bluetooth speaker operatively; determine a location of the Bluetooth speaker relative to a vehicle reference point; and adjust an audio balance of the Bluetooth speaker based on the determined location of the in-vehicle Bluetooth speaker relative to the vehicle reference point.

In some embodiments, the vehicle may further comprise an in-vehicle speaker operatively connected to the in-vehicle Bluetooth-enabled audio system.

In some embodiments, the in-vehicle Bluetooth-enabled audio system adjusts the audio balance of the Bluetooth speaker to provide a left/right balance reflective of an audio in-vehicle audio balance experience effectuated by the in-vehicle speaker.

In some embodiments, the in-vehicle Bluetooth-enabled audio system adjusts the audio balance of the Bluetooth speaker by at least one of adjusting at least one of left channel and right channel volume output of the Bluetooth speaker, and mixing output of the left and right channels.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Current short-range wireless technologies, such as Bluetooth, allow users to transmit or stream data, e.g., music, to a remote Bluetooth-enabled speaker. Bluetooth technology also allows users to connect a source device, such as a user's smartphone, to an in-vehicle head unit, entertainment system, or other vehicle system. In this way, a user may play music stored on the user's smartphone through the speakers of the in-vehicle entertainment system, in-vehicle speakers can be used to present incoming calls received on the user's smartphone, and so on.

In accordance with some embodiments, one or more external Bluetooth speakers may be used in conjunction with an in-vehicle Bluetooth-enabled audio system, such as the aforementioned in-vehicle head unit, entertainment system, etc. to effectuate audio sharing. Moreover, locational features or aspects of the Bluetooth standard can be leveraged in a manner that allows for automatic or manual adjustment of the one or more external Bluetooth speakers. For example, in accordance with some embodiments, left/right balance of the one or more external Bluetooth speakers can be adjusted based on the position or location of the or more external speakers relative to the vehicle. Although conventional Bluetooth-enabled speakers can be configured to work in or out of a vehicle, e.g., a removable Bluetooth speaker that can be used external to a vehicle or "plugged into" a vehicle, conventional Bluetooth-enabled speakers are not able to tune or adjust/be tuned or adjusted on their location/position relative to a vehicle while also operating with in-vehicle operating systems that include in-vehicle speakers.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 1:
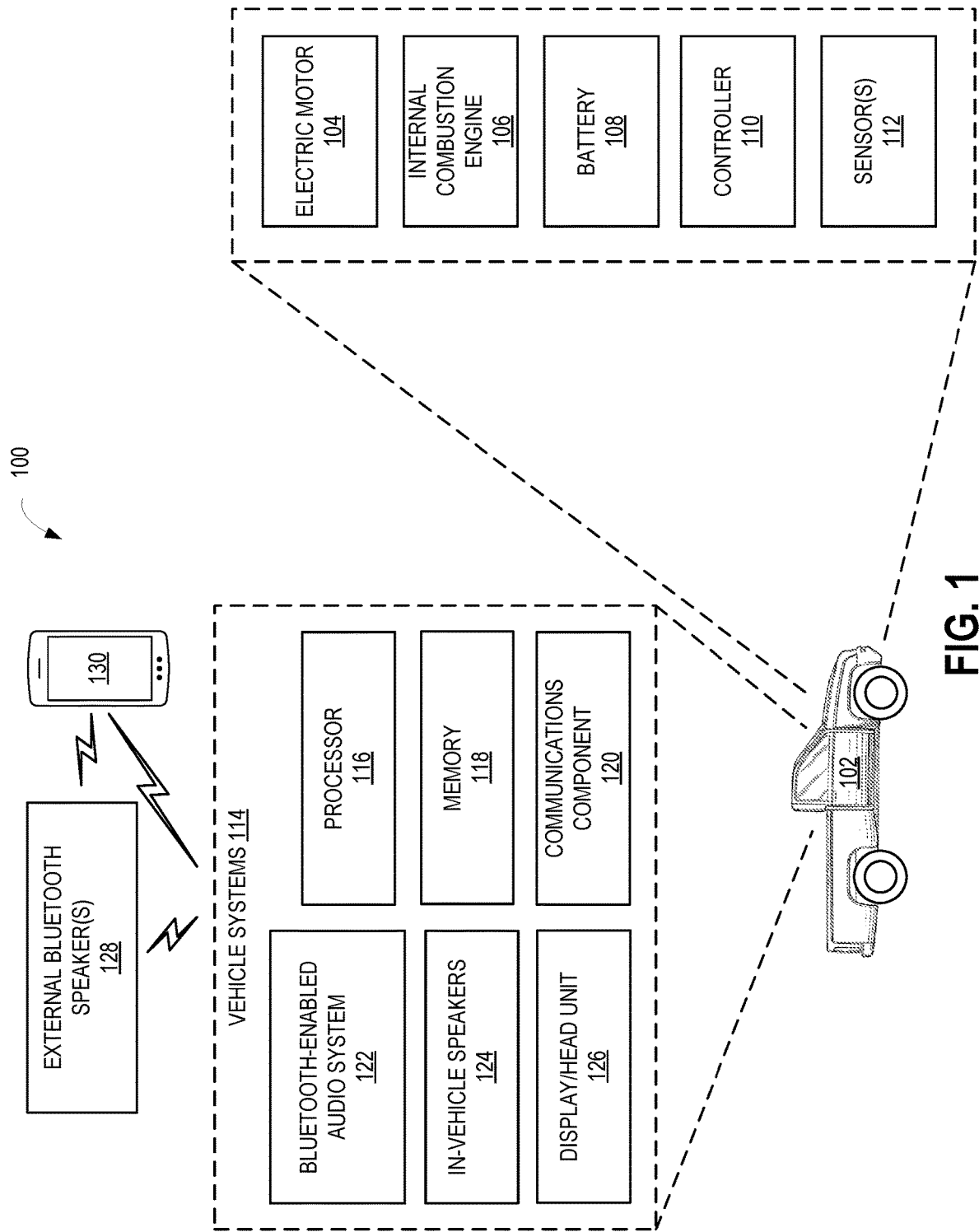
FIG. 1 is a schematic representation of a vehicle-based audio system in accordance with one embodiment.

FIG. 1 illustrates an example system 100 for cooperative operation of external speakers and in-vehicle speakers/entertainment systems that allow for balance adjustment of the external speakers in accordance with various embodiments. FIG. 1 illustrates a vehicle 102, which can be a hybrid vehicle having an electric motor 104 and an internal combustion engine 106, both of which generate driving force. Various types of internal combustion engines may be embodied by internal combustion engine 106, such as a gasoline or diesel engine. Various types of electric motors may be embodied by electric motor 104, such as a brushless direct current (DC) motor, an induction motor, or a DC shunt motor. It should be noted that various embodiments are not limited to use in/for a hybrid vehicle, but any vehicle or any other structure, body, or entity having a Bluetooth-enabled system that can be operatively connected to one or more Bluetooth speakers located external to the vehicle, structure, body, entity.

Hybrid vehicle 102 may include a battery 108 for supplying electric power to drive electric motor 104. Battery 108 may be a rechargeable battery, such as, for example, a lead-acid battery, a nickel-cadmium battery, a natrium sulphur battery, a lithium rechargeable battery, a hydrogen rechargeable battery or a redox type battery. Battery 108 may also be a mass storage condenser, or other suitable power source. It should be noted that hybrid vehicle 102 may have more than one battery, and applying pre-charge timing as described herein can be coordinated between the multiple batteries.

Although not shown, it should be understood that hybrid vehicle 102 may further comprise a battery current/voltage detection sensor for detecting electric current and voltage of battery 108. Hybrid vehicle 102 may also include a driver for changing electric current supplied from the battery 108 into an electric value to produce a predetermined torque by electric motor 104. The driver may further control regeneration current flow electric motor 104 to the battery 108. Hybrid vehicle 102 may include other un-illustrated components typically found in hybrid vehicles, such as an engine control system, a braking system/components, a steering system/components, logic components, other processors, etc.

Hybrid vehicle 102 may include a controller 110 that controls the overall operation of hybrid vehicle 102, one or more sensors 112 connected to the controller 110 also connected to the controller 110. Controller 110 can judge driving conditions based on various detection signals supplied from the one or more sensors 112 in order to define the driving condition of the hybrid vehicle. It should be noted that various embodiments described herein are not limited to use with a hybrid vehicle. Various embodiments may be implemented in/for use with any type of vehicle. In still other embodiments, various embodiments may be implemented in any context/structure/apparatus/mechanism in which auto-balancing of Bluetooth-enabled speakers sharing audio with another Bluetooth-enabled system, speakers, etc.

Vehicle systems 114 of hybrid vehicle 102 may include processor 116, as well as memory 118. In some embodiments, additional components may make up vehicle systems 114.

One or more communications components 120 may connect vehicle systems 114 (and components therein) to one or more external devices or networks. As will be described in greater detail below, a Bluetooth-enabled audio system 122 may operatively connect to one or more external Bluetooth speakers 128 and a source device, such as a user's smartphone 130. It should be understood that in some embodiments, communications can be effectuated directly with Bluetooth-enabled audio system 122, e.g., between smartphone 130 and Bluetooth-enabled audio system 122. In some embodiments, communications component 120 may comprise Bluetooth circuitry configured to effectuate Bluetooth communications between, e.g., smartphone 130 and display/head unit 126 as well as with audio system 122, which in some embodiments may not necessarily be Bluetooth-enabled by itself.

Vehicle systems 114 may further include one or more in-vehicle speakers 124 through which audio, for example, originating from Bluetooth-enabled audio system 122 which can include a radio, some other in-vehicle media source, etc. In-vehicle speakers 124 may further output audio originating from smartphone 130 and streamed/relayed through Bluetooth-enabled audio system 122.

A display/head unit 126 may be included as party of vehicle systems 114, and can comprise one or more input/output mechanisms or interfaces through which a user, such as an operator or passenger of vehicle 102, may control Bluetooth-enabled audio system 122 or indirectly control smartphone 130. For example, upon establishing a connection, e.g., Bluetooth connection, from smartphone 130 to vehicle systems 114, a user may access and utilize one or applications installed/hosted on smartphone 130 through display/head unit 126 of vehicle systems 114. In some embodiments Bluetooth-enabled audio system 122 may be a part of display/head unit 126. For example, display/head unit 126 may comprise navigation components, heating ventilation and air conditioning (HVAC) system/interface(s), as well as a media component, such as Bluetooth-enabled audio system 122. In some embodiments Bluetooth-enabled audio system 122 may simply be a Bluetooth interface allowing a Bluetooth-enabled source device to operatively connect to vehicle systems 114. In some embodiments, such a Bluetooth interface or Bluetooth-enabled system need not be limited to an audio system, but can rather be more of a universal interface or component/system.

As will be described in greater detail below, in accordance with some embodiments, the left/right balance of one or more external Bluetooth speakers, such as external Bluetooth speakers 128 may be adjusted based on their location or position relative to the vehicle 102 or some aspect of the vehicle 102. For example, the left/right balance of external Bluetooth speakers 128 may be adjusted based on their position or location relative to a center of vehicle 102, or a central axis of vehicle 102, or the location of in-vehicle speakers 124 or Bluetooth-enabled audio system 122, and so on. In this way, despite external Bluetooth speakers 128 being used outside of vehicle 102, the audio listening experience inside of vehicle 102 can be extended to the outside of vehicle 102 as well. Processor(s) 116 may execute an algorithm(s) or logic stored in memory 118 enabling the location or position of external Bluetooth speaker(s) 128 to be determined based on location direction finding signals from external Bluetooth speaker(s) 128. Based on the determined location or position, processor(s) 116 may execute the algorithm(s) or logic to further determine position relative to a desired reference point in/of vehicle 102.

Based on these determinations, the left/right balance of external Bluetooth speaker(s) 128 can be adjusted. In some embodiments, processor(s) 116 may automatically adjust the left/right balance. In some embodiments, these determinations may be performed periodically or aperiodically as a user(s) may change or alter the location or position of external Bluetooth speakers 128, or the location or position of external Bluetooth speakers 128 may change due to external or environmental conditions or stimuli. In other embodiments, processor(s) 116 may present one or more options on display/head unit 126 to a user so that the user may manually adjust left/right balance in accordance with a suggested balance adjustment, or authorize automatic or dynamic adjustment of the left/right balance.

It should be understood that the Bluetooth 5.1 and 5.2 standards specify Bluetooth location services that can use information about the direction of a Bluetooth-enabled device to determine that Bluetooth-enabled device's location. For example, in some embodiments, Bluetooth-enabled audio system 122 may receive one or more direction finding signals from external Bluetooth-enabled speakers 128. Each of external Bluetooth-enabled speakers 128 may transmit such a direction finding signal using an antenna. Bluetooth-enabled audio system 122 may have multiple antennas, e.g., arranged in an array, for receiving such direction finding signals. As a direction finding signal is received by Bluetooth-enabled audio system 122, the direction finding signal may cross the antenna array, and Bluetooth-enabled audio system 122 or processor(s) 116 may observe a signal phase difference due to the difference in distance from each of the antennas of the antenna array. IQ samples of the direction finding signals can be obtained while switching between active antennas of the antenna array. It should be understood that an IQ sample can refer to a pair of in-phase and quadrature-phase samples. Based on this sample information, the relative direction from which the direction finding signal originated can be calculated by Bluetooth-enabled audio system 122 or processor(s) 116, the relative direction of origination corresponding to a direction indicative of the location or position of external Bluetooth speakers 128. In other words, the angle of arrival of the direction finding signal can be determined in order to derive the location or position of the external Bluetooth speakers 128 relative to the Bluetooth-enabled audio system 122.

Figure 5:
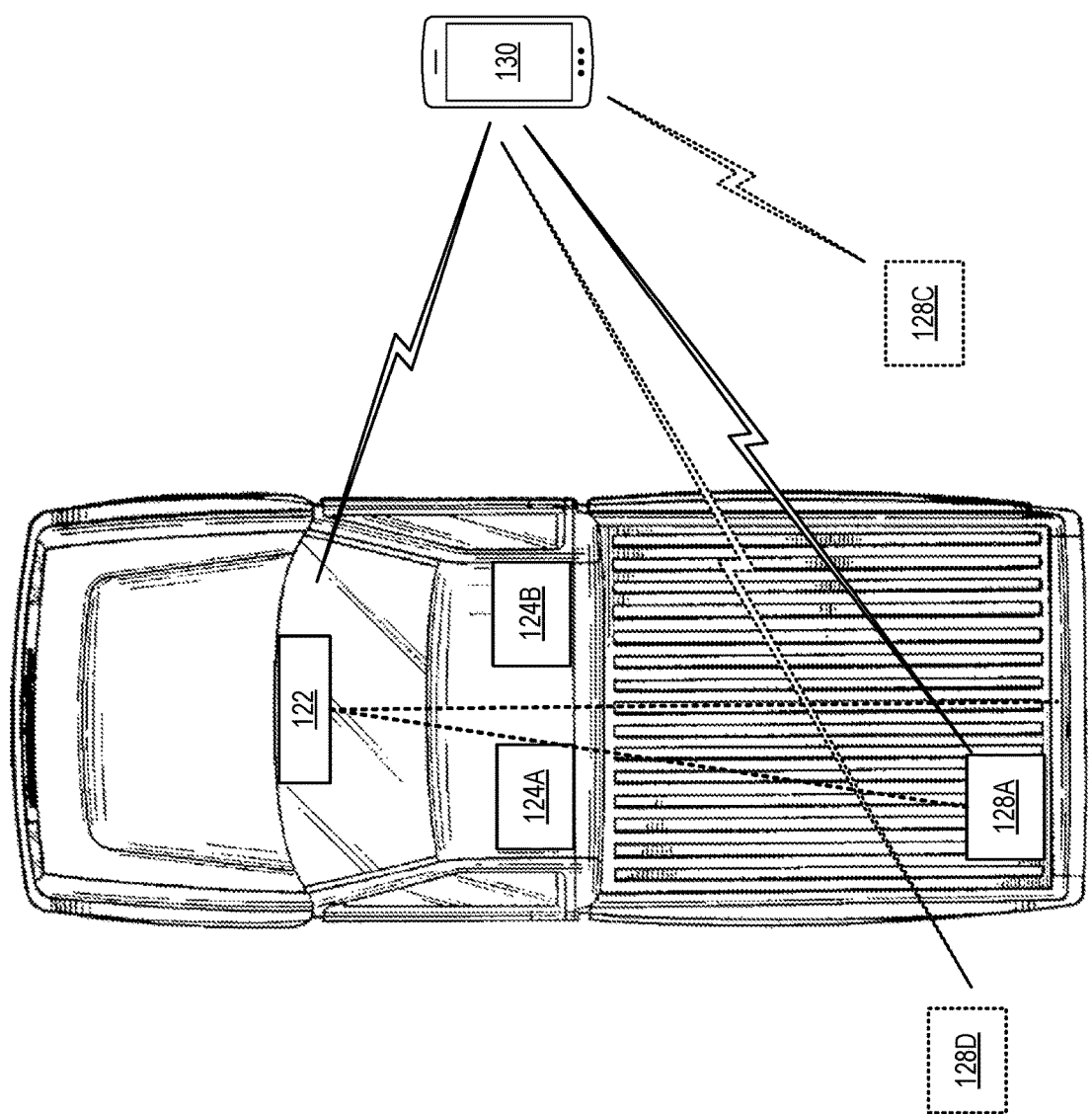
FIG. 5 is a graphical representation of yet another example use case scenario of the vehicle-based audio system of FIG. 1.

To determine location relative to another one or more aspects, locations, points of vehicle 102, processor(s) 116 or Bluetooth-enabled audio system 122 may calculate a distance, angular difference, etc. from the Bluetooth-enabled audio system 122 (which may act as a reference point) from a desired point/location in vehicle determined direction/location/position. For example, in some embodiments, using real time locating systems (RTLS), the position of external Bluetooth speakers 128 may be tracked. Such location determinations can be used instead of the aforementioned direction finding mechanism or can be used in conjunction with the aforementioned direction finding mechanism for increased accuracy in location determination. Vehicle 102 may be outfitted with supplementary locator receivers. The External Bluetooth speakers 128 may be identified using a "tag" identifiable by the RTLS, such that its position is determinable in real-time. Such tags can implemented in/on the external Bluetooth speakers 128. In some embodiments, a scale can be defined regarding an amount or level of balance to be applied. For example 10 steps of balance (left to right mix ratio) can be defined to be a maximum amount of balance/maximum threshold relative to a locator reference point, e.g., the location of Bluetooth-enabled audio system 122, which may also comprise a location engine. Any travel or positioning beyond the locator reference point to either side can be used to signal ceasing making any changes to the balance until the location of external Bluetooth speakers 128, identifiable via the aforementioned tag is within/below the maximum range. Referring to FIG. 5 (described in greater detail below), for example, locators/locator receivers may be implemented in/or as part of in-vehicle speakers 124 and 124B and Bluetooth-enabled audio system 122. In this way, the left/right balance can be adjusted relative to the desired reference point or location, e.g., to mimic the left/right balance of in-vehicle speakers, extrapolate the in-vehicle audio balance to an environment external to the vehicle vis-à-vis the external Bluetooth speaker(s) 128, and so on. For example, the further to the left an external Bluetooth speaker 128 is from the center axis of vehicle 102 (along which Bluetooth-enabled audio system 122 is positioned), the left/right balance of the external Bluetooth speaker 128 may be adjusted to skew to the right to compensate for being so far to the left. In some embodiments, actual distance from a location/point of vehicle 102 or Bluetooth-enabled audio system 122 can impact how far away (left/right) an external Bluetooth speaker 128 may be positioned. Thus, absolute distance from a reference point may also be considered or used to weight a calculated angle of arrival. During use/over the course of time, external Bluetooth speakers may be moved, jostled, or otherwise repositioned such that an external Bluetooth speaker originally positioned to the left of a vehicle reference point moves to a position to the right of that vehicle reference point. In this case, the left/right balance of that external Bluetooth speaker can be, e.g., reversed from its original balance setting.

In some embodiments, angle of departure may be used to determine a direction and ultimately, the position of one or more external Bluetooth speakers 128 relative to a point in vehicle 102, Bluetooth-enabled audio system 122, etc. In this embodiment, the one or more external Bluetooth speakers 128 may have multiple antennas in an array for transmitting direction finding signals, while Bluetooth-enabled audio system 122 may have a single receiving antenna for receiving such direction finding signals. Similar to the angle of arrival method described above, IQ samples may be obtained, and Bluetooth-enabled audio system 122 can calculate a relative signal direction.

Figure 2:
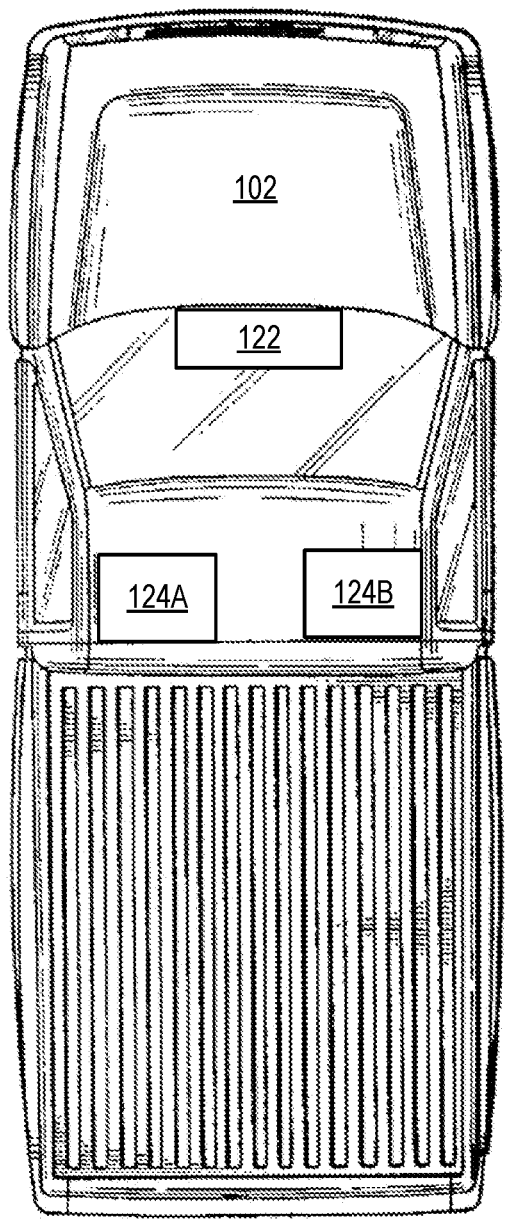
FIG. 2 is a graphical representation of an example vehicle-based audio system layout

FIG. 2 illustrates an example audio system layout in a vehicle, such as vehicle 102. As illustrated in FIG. 2, Bluetooth-enabled audio system 122 may be located in/near the center dash/display/head unit of vehicle 102. In some embodiments, this location of Bluetooth-enabled audio system 122 may comprise a vehicle reference point relative to which the left/right balance of externally located speakers may be adjusted. In this example, FIG. 2 illustrates a plurality of in-vehicle speakers 124 and 124B positioned within vehicle 102's interior along a back panel of vehicle 102's cabin.

Conventionally, a user may adjust the left/right balance of each of speakers 124A and 124B or in conjunction with one another. For example, a user, e.g., a driver, may adjust the overall left/right balance experienced in the cabin of vehicle

102. That is, the user may wish for audio to be output from speaker 124B at a greater volume than audio output from speaker 124A. This is because if the driver is seated in the driver's seat (left side of vehicle 102 in certain regions), the user is closer to speaker 124A. In order to achieve balanced audio output from the perspective of the user, the output level of speaker 124A may be reduced relative to that of speaker 124B which is further away from the user.

Figure 3:
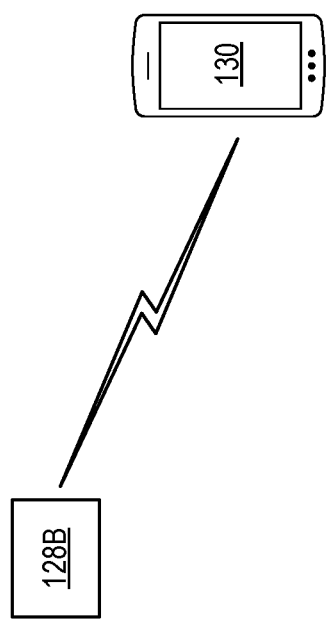
FIG. 3 is a graphical representation of an example use case scenario of the vehicle-based audio system of FIG. 1.

FIG. 3 illustrates a conventional example of a mobile device streaming audio to a speaker. In this example, a user may pair mobile device 130 to a speaker 128B, which may an external Bluetooth speaker. After pairing, mobile device 130 may transmit audio signals to be output through external Bluetooth speaker 128B. Although mobile device 130 may have a resident equalizer functionality, an application providing control over external Bluetooth speaker 128B, the left/right balance relative to a vehicle reference point(s) is not possible.

Thus, and as alluded to above, in some embodiments, the audio sharing capabilities realized with more recent features set forth in the Bluetooth standard (e.g., Bluetooth 5.1/5.2), can allow audio from a source to be streamed to multiple devices (either on a personal basis or locational basis). In the example illustrated in FIG. 3, one or more of mobile device 130, Bluetooth-enabled audio system 122, and external Bluetooth speakers 128A and 128B may be compatible with the Bluetooth standard allowing for audio sharing. Thus, mobile device 130 may stream audio to both Bluetooth-enabled audio system 122 and to each of external Bluetooth speakers 128A and 128B. In this example, external Bluetooth speakers 128A and 128B are located external to the cabin of vehicle 102, in/on the cargo bed of vehicle 102. For example, the user may be participating in a tailgate event, and wishes to hear audio streamed from his/her mobile device 130 to external speakers.

Figure 4:
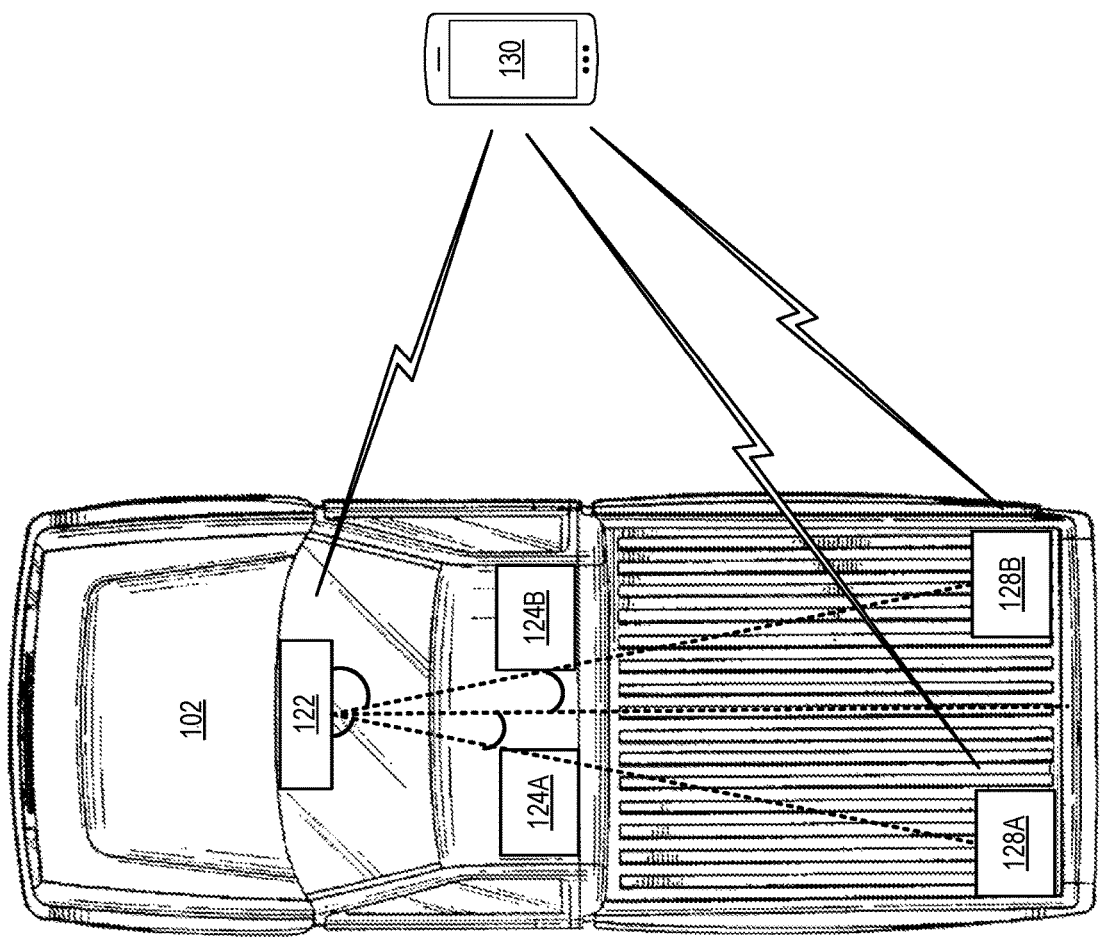
FIG. 4 is a graphical representation of another example use case scenario of the vehicle-based audio system of FIG. 1.

Referring now to FIG. 4, and as described above, the locational aspects/features of the Bluetooth standard may be leveraged to determine the location(s)/position(s) of external Bluetooth speakers 128A and 128B relative to some vehicle reference point, such as Bluetooth-enabled audio system 122 or a central axis of vehicle 102, etc. Using angle of arrival or angle of departure mechanisms, the location of external Bluetooth speaker 128A may be determined to be some given distance to the left of, e.g., Bluetooth-enabled audio system 122, while the location of external Bluetooth speaker 128B is determined to be some given distance to the right of Bluetooth-enabled audio system 122. Upon determining the relative locations/positions of external Bluetooth speakers 128A and 128B, processor 116 (FIG. 1) may determine output levels for each of external Bluetooth speakers 128A and 128B to create a desired left/right balanced experienced. In some embodiments, processor 116 may determine the left/right balance of in-vehicle speakers 124A and 124B, and apply the same left/right balance settings to external Bluetooth speakers 128A and 128B. in some embodiments, processor 116 may determine some distance offset relative to in-vehicle speakers 124A or 124B, and adjust the left/right balance of external Bluetooth speakers 128A and 128B to mimic a left/right balanced experience as if external Bluetooth speakers 128A and 128B were located in the cabin of vehicle 102. It should be noted that in some embodiments, front/rear fading may be adjusted in a similar manner.

It should be understood that while some embodiments are described as providing a desired left/right balanced experienced by controlling or adjusting volume output by one or more external Bluetooth speakers, adjusting balance may further or alternatively involve mixing left/right channels, dynamically fading left to right/right to left, creating a centered effect, summing stereo to mono, and so on. In some embodiments, certain audio tracks/files or functionality resident within mobile device 130 may already have "built-in" spatial audio features. Accordingly, in some embodiments, upon determining a desired balance/mixing effect(s), mobile device 130 may further control/adjust operating conditions of external Bluetooth speakers 128A and 128B to accommodate the desired balance/mixing effect(s).

It should be noted that upon receiving a direction finding signal from, e.g., one of external Bluetooth speakers 128A or 128B, Bluetooth-enabled audio system 122 may recognize it should operate in an audio sharing mode (as opposed to a conventional mode of operation as illustrated in FIG. 3). Thus, Bluetooth-enabled audio system 122 may enable audio sharing of audio signals received from mobile device 130 to one or more of external Bluetooth speakers 128A and 128B. In some embodiments, it may be external Bluetooth speakers 128A or 128B that receive a direction finding signal from Bluetooth-enabled audio system 122 that may trigger audio sharing therebetween or between mobile device 130 and external Bluetooth speakers 128A/128B. In some embodiments, mobile device 130 may specify or enable audio sharing specifically between itself and Bluetooth-enabled audio system 122 as well as external Bluetooth speakers 128A, 128B. In some embodiments, mobile device 130 may specify that any Bluetooth-enabled devices within a given proximity or within some threshold distance from mobile device 130 can share audio streamed from mobile device 130.

FIG. 5 illustrates yet another audio sharing example(s), where a single external Bluetooth speaker 128A, or three external Bluetooth speakers 128A, 128C, 128D is/are receiving audio from mobile device 130 or Bluetooth-enabled audio system 122. In such a scenario, as alluded to above, adjusting balance may involve effectuating a more centered audio image or balanced experienced, and channel mixing may be more subtly performed (in the case a single external Bluetooth speaker is at issue). Alternatively, three or more external Bluetooth speakers (128A, 128C, 128D) may be used, in which case, more discrete left/right channel separation may be effectuated, and so on.

Figure 6:
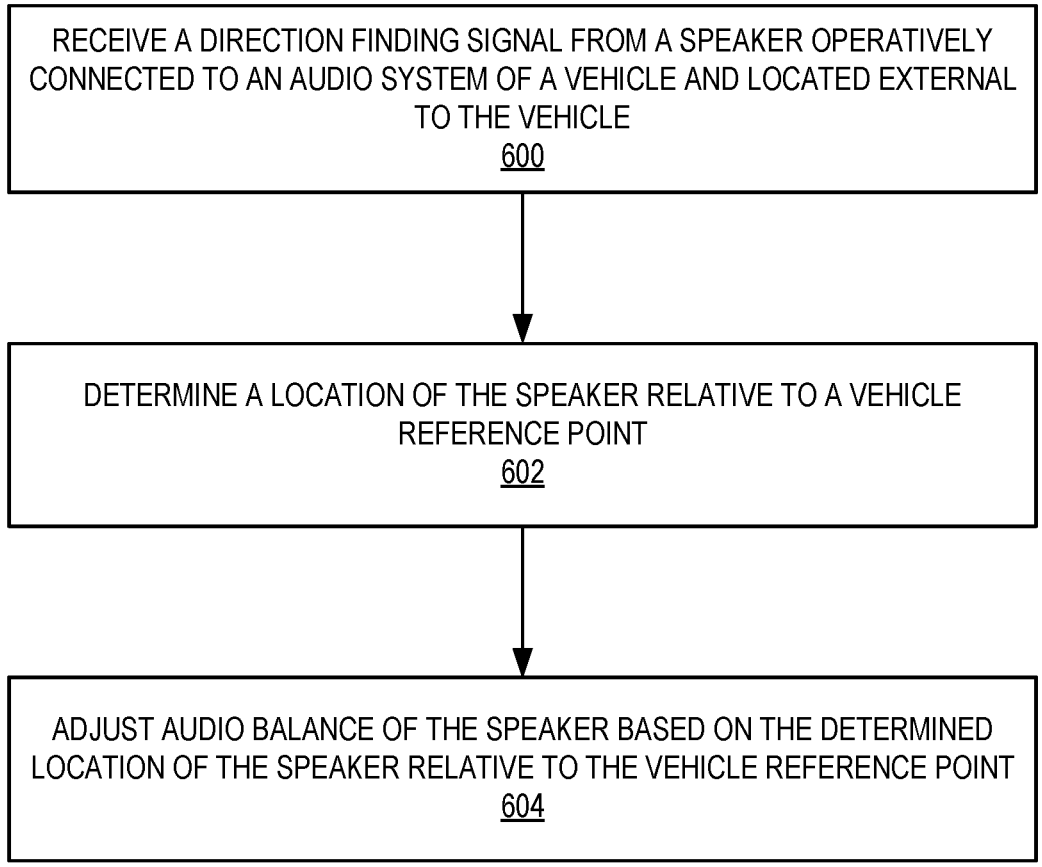
FIG. 6 is a flow chart illustrating example operations that can be performed to adjust the balance of external speakers operatively connected to an vehicle-based audio system in accordance with one embodiment.

FIG. 6 is a flow chart illustrating example operations that may be performed to effectuate balancing of external Bluetooth speakers based on positioning relative to a vehicle. Such operations may be performed/executed by a Bluetooth-enabled system, such as Bluetooth-enabled audio system 122, processor 116 of vehicle systems 114, etc. However, it should be understood that in accordance with other, one or more Bluetooth-enabled components such as external Bluetooth speaker(s) 128 may themselves perform such operations, or a source device, such as mobile device 130 may alone, or in conjunction with vehicle systems 114, Bluetooth-enabled audio system 122, etc. perform such operations.

At operation 600, a direction finding signal may be recited from a speaker operatively connected to an audio system of a vehicle, and located external to the vehicle. As described above, in some embodiments, Bluetooth-enabled audio system 122 may receive direction finding signals from external Bluetooth speaker(s) 128, leveraging the capabilities of devices compliant with Bluetooth 5.1/5.2, for example.

At operation 602, a location of the speaker is determined relative to a vehicle reference point. In some embodiments, the vehicle reference point be a center (defined by a central axis) of the vehicle, the audio system, e.g., Bluetooth-enabled audio system 122, some other defined/determined reference point, etc. As described above, upon determining the direction of a received direction finding signal, from an external Bluetooth speaker, the audio system can ascertain where the external Bluetooth speaker is relative to the vehicle reference point. For example, the direction of the external Bluetooth speaker may be determined to be some angular distance from a central axis of the vehicle. In some embodiments, the central axis of the vehicle may coincide with/cross a locator/location engine implemented e.g., in Bluetooth-enabled audio system 122. An externa Bluetooth speaker can be implemented with tag whose location can be determined by the location engine relative to the locator. In some embodiments, multiple locators, e.g., three, may be implemented in/on a vehicle to perform trilateration to allow the location engine to determine a triangulated location of the external Bluetooth speaker.

At operation 604, audio balance of the speaker is adjusted based on the determined location of the at least one speaker relative to the vehicle reference point. As noted above, various embodiments are directed to adjusting the balance of externally located Bluetooth speakers to extend or maintain the audio dynamics a passenger in the vehicle may experience while being outside the vehicle. Volume output, channel mixing, and the like can be adjusted or adapted to some determined relative balance setting(s), for example. In some embodiments, operations 600 through 604 can be repeated so that if/when one or more of the speakers is/are moved, the balance can be adjusted accordingly to maintain the desired audio dynamics.

Figure 7:
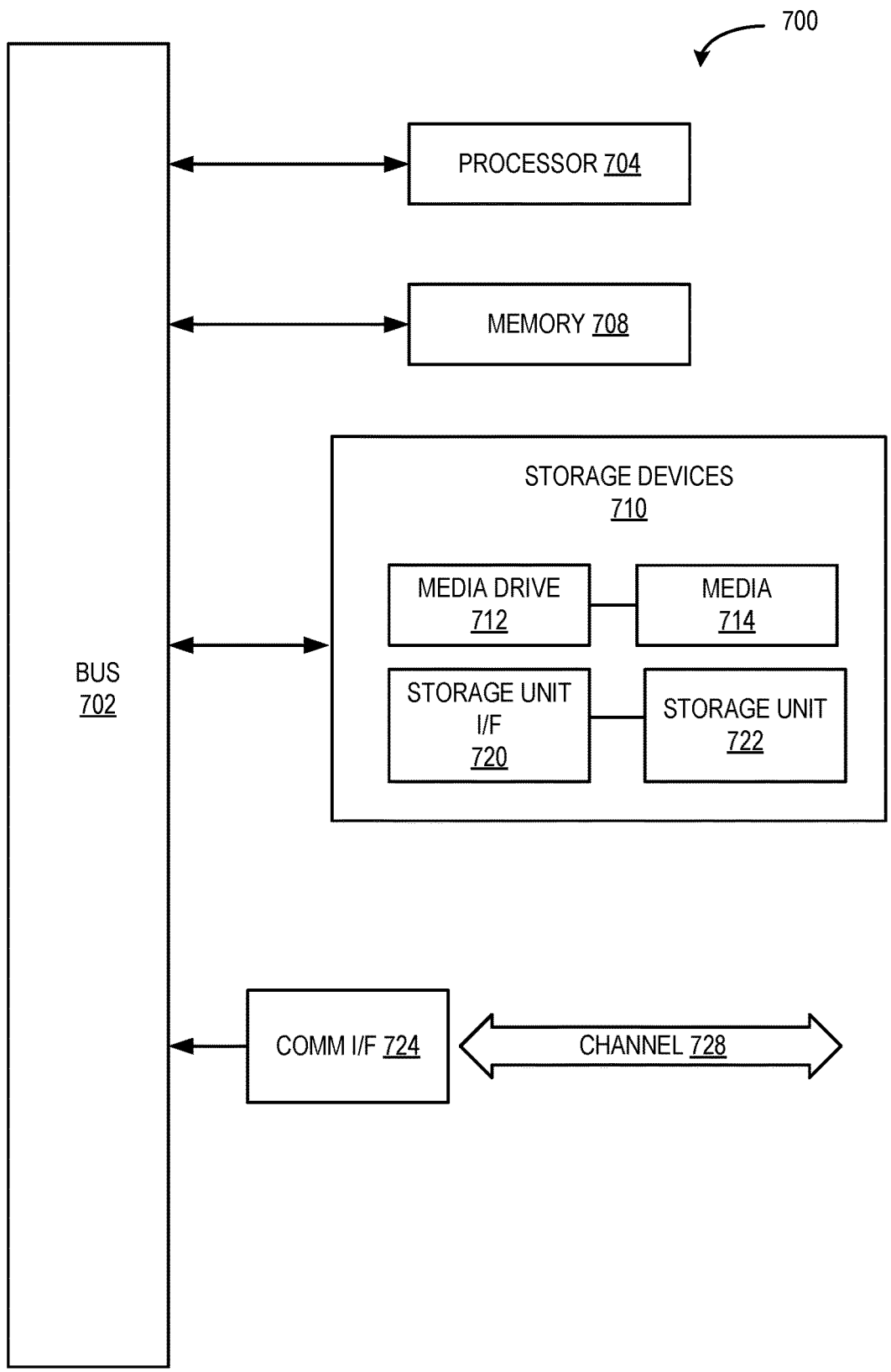
FIG. 7 is an example computing component that may be used to implement various features of embodiments described in the present disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 7. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, note-book, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up navigation system 214 and its component parts, navigation server/network 224, and controller 210. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
    receiving, at an audio system of a vehicle, a direction finding signal from an external speaker, wherein the external speaker is operatively connected to the audio system of the vehicle and located external to the vehicle, and wherein the audio system of the vehicle includes one or more internal speakers;
    determining, by the audio system of the vehicle, a location of the external speaker relative to a vehicle reference point, wherein the vehicle reference point corresponds with a center of the vehicle that creates portions of the vehicle relative to the vehicle reference point as a left side of the vehicle and a right side of the vehicle; and
    adjusting, by the audio system of the vehicle, a right audio balance and a left audio balance of the external speaker based on the location of the external speaker relative to the vehicle reference point, wherein the adjusting is to dynamically fade the right audio balance to the left audio balance when the external speaker is located at the left side of the vehicle and dynamically fade the left audio balance to the right audio balance when the external speaker is located at the right side of the vehicle.

2. The method of claim 1, wherein the external speaker comprises a Bluetooth speaker, and wherein the audio system comprises an in-vehicle Bluetooth-enabled audio system.

3. The method of claim 1, further comprising receiving streamed audio from a source device operatively connected to the audio system.

4. The method of claim 1, wherein adjusting of the right audio balance and left audio balance of the external speaker is performed automatically upon locating the external speaker to the left side of the vehicle reference point.

5. The method of claim 1, wherein determining the location of the external speaker comprises at least one of determining an angle of arrival or angle of departure calculation regarding the direction finding signal, and determining a location through trilateration via a plurality of locator receivers and a tag associated with the external speaker.

6. The method of claim 1, wherein the right audio balance and the left audio balance of the external speaker is dynamically faded to emulate in-vehicle audio balance experienced externally to the vehicle.

7. The method of claim 1, further comprising:
upon receiving the direction finding signal, initiating operation of the audio system in an audio sharing mode of audio signals received from a mobile device; and
receiving an indication of audio sharing between the mobile device and a Bluetooth-enabled device.

8. The method of claim 7, wherein the audio sharing between the mobile device and the Bluetooth-enabled device is limited to a duration when the Bluetooth-enabled device is located within a threshold distance of the mobile device.

9. The method of claim 7, wherein the Bluetooth-enabled device is compliant with Bluetooth 5.1 or 5.2 protocols.

10. The method of claim 1, wherein the location of the external speaker relative to the vehicle reference point is located at an angular distance from a central axis of the vehicle.

11. The method of claim 1, wherein the location of the external speaker is additionally stored on a tag associated with the external speaker.

12. The method of claim 1, further comprising:
incrementally repeating steps to adjust the right audio balance to the left audio balance corresponding with moving the external speaker, comprising:
receiving, at the audio system of the vehicle, a second direction finding signal from the external speaker,
determining, by the audio system of the vehicle, a second location of the external speaker relative to the vehicle reference point, and
adjusting, by the audio system of the vehicle, the right audio balance and the left audio balance of the external speaker based on the second location of the external speaker.

13. The method of claim 1, wherein the audio system of the vehicle communicates with an array of antennas for receiving multiple direction finding signals.

14. The method of claim 1, wherein the external speaker is enabled to be plugged into the vehicle.

15. A vehicle comprising:
a Bluetooth speaker located externally to the vehicle; and
an in-vehicle Bluetooth enabled audio system comprising a first and second in-vehicle speaker, the in-vehicle Bluetooth enabled audio system configured to:
receive a direction finding signal from the Bluetooth speaker,
determine a distance offset of the Bluetooth speaker relative to the first and second in-vehicle speaker, the first and second in-vehicle speaker having a left audio balance and a right audio balance,
dynamically fade the right audio balance to the left audio balance of the first and second in-vehicle speaker when the Bluetooth speaker is located at a left side of the vehicle, and
dynamically fade the left audio balance to the right audio balance of the first and second in-vehicle speaker when the Bluetooth speaker is located at a right side of the vehicle.

* * * * *